Sept. 18, 1956  P. C. ARNOLD  2,763,770
WELDING APPARATUS AND METHOD
Filed July 28, 1953  4 Sheets-Sheet 1
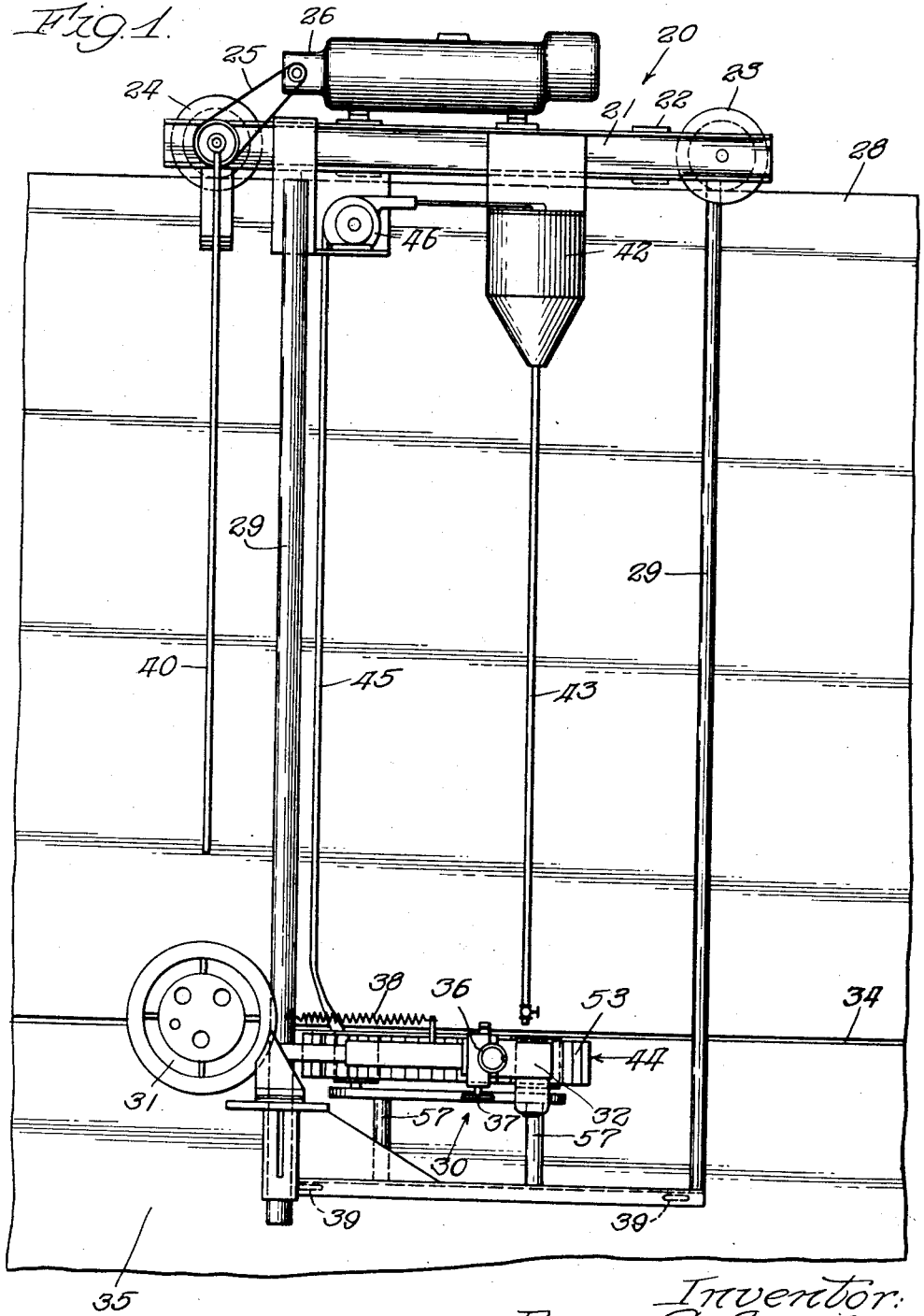

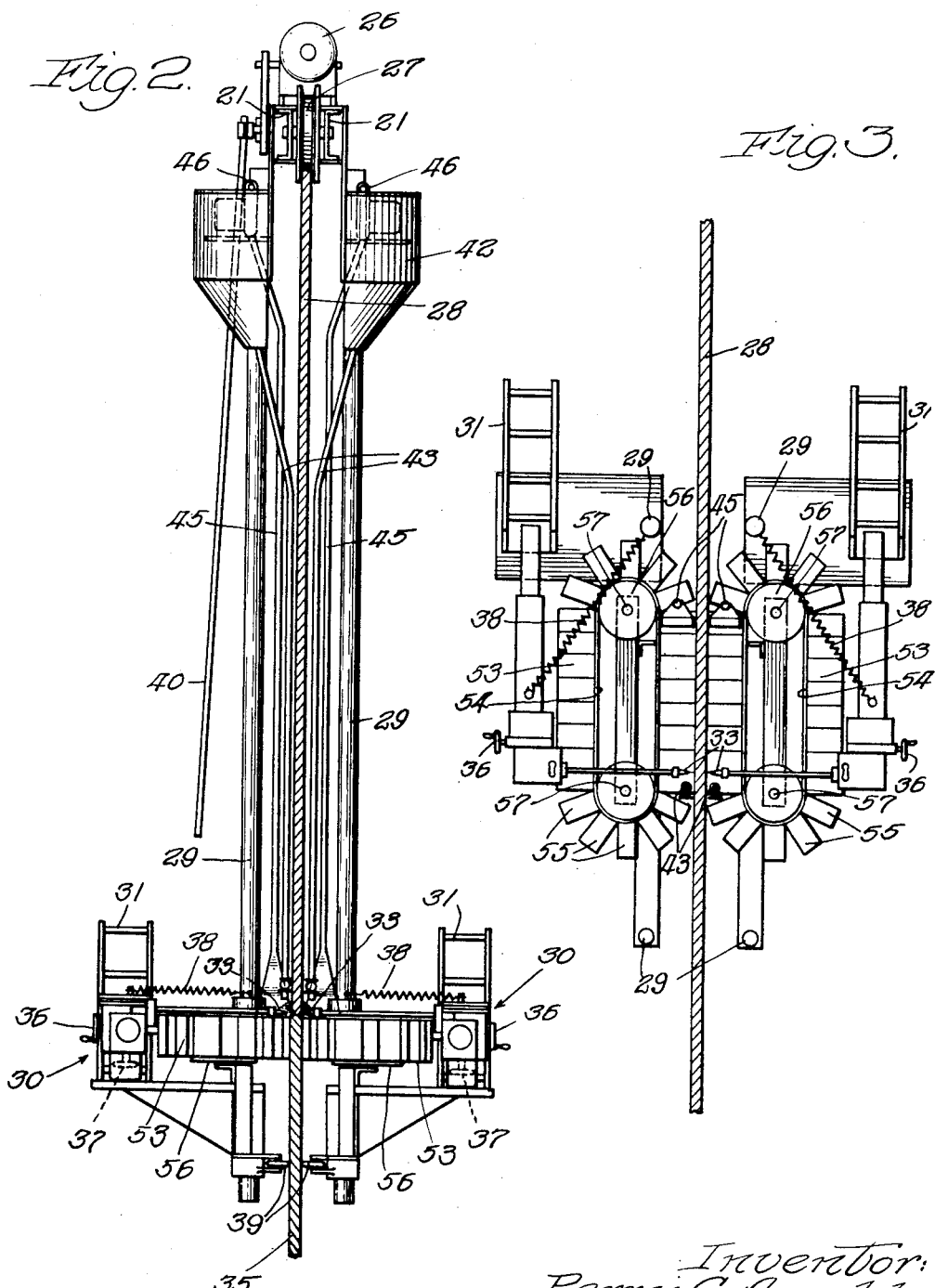

Sept. 18, 1956  P. C. ARNOLD  2,763,770
WELDING APPARATUS AND METHOD
Filed July 28, 1953  4 Sheets-Sheet 3

Inventor:
Perry C. Arnold,
By Schroeder, Merriam,
Hofgren & Brady, Attys.

Sept. 18, 1956 P. C. ARNOLD 2,763,770
WELDING APPARATUS AND METHOD
Filed July 28, 1953 4 Sheets-Sheet 4
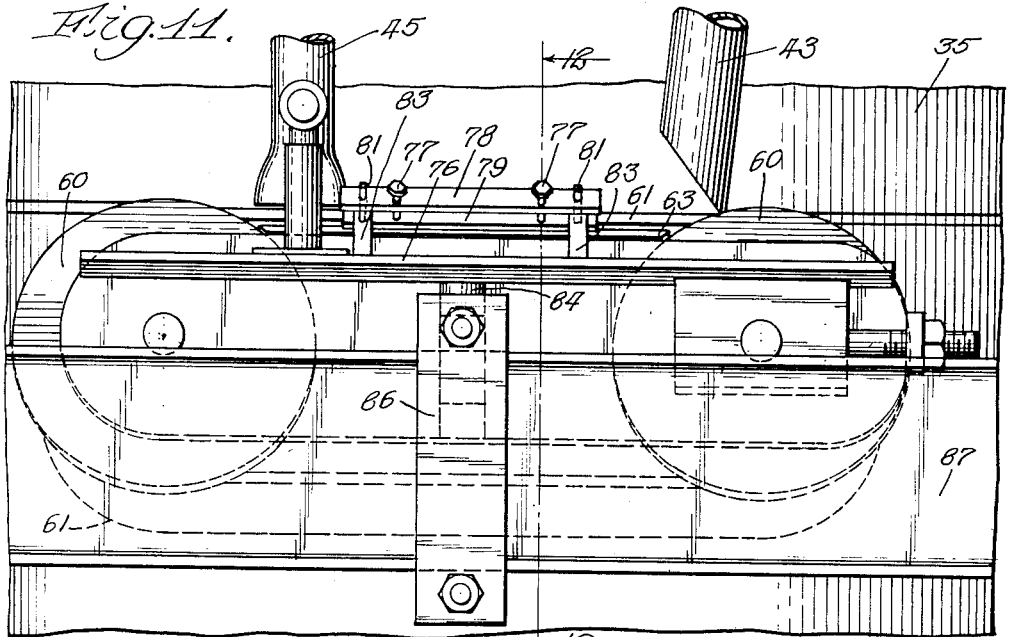
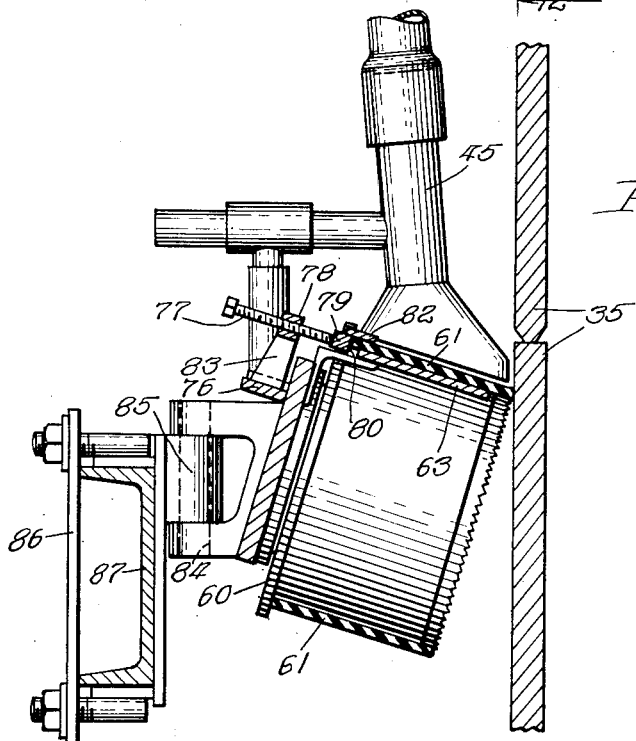

United States Patent Office 2,763,770
Patented Sept. 18, 1956

2,763,770

WELDING APPARATUS AND METHOD

Perry C. Arnold, Chicago, Ill., assignor to Chicago Bridge & Iron Company, a corporation of Illinois Application July 28, 1953, Serial No. 370,816

12 Claims. (Cl. 219—126)

This invention relates to welding, and more particularly to a method and apparatus for continuously welding a long seam.

This application is a continuation-in-part of my copending application Serial No. 131,223, filed December 5, 1949, and entitled "Welding Apparatus and Method", now Patent No. 2,713,106, dated July 12, 1955.

Hand welding of long seams is a particularly tedious, time-consuming and, hence, expensive operation. Long horizontal seams are found in many types of construction and very often in the construction of welded liquid storage tanks. In such tanks, which may have a diameter of 200 feet or more, a number of plates are welded in edge-to-edge relationship along circular horizontal beams. Where there are several of such seams to be welded on both sides, the total length of seam is considerable.

I have invented and am herein disclosing and claiming, a method and apparatus for continuously welding long seams. The apparatus of this invention is particularly adapted for use in welding horizontal seams between plates forming part of a circular structure such as a liquid storage tank. The invention involves the use of automatic metal arc welding and is particularly adaptable for use with the submerged arc welding process.

According to this invention, I provide a self-powered carriage adapted to roll along the upper edge of a vertical plate and to carry a welding apparatus along the seams between that plate and the next adjoining lower plate. I provide the carriage with the necessary apparatus to permit the entire circumference of the tank along a single seam to be welded in a single pass. In addition, both sides of the seam may be welded simultaneously, if desired.

The invention will be described in conjunction with the accompanying drawings, of which:

Fig. 1 is a side elevation of the apparatus of this invention in position on a portion of the side walls of a liquid storage tank;

Fig. 2 is a vertical section along line 2—2 of Fig. 1;

Fig. 3 is a horizontal section along line 3—3 of Fig. 1;

Fig. 11 is an enlarged front view of a flux belt similar to the belt shown in Figures 7 and 8 showing specifically the support for the belt; and Fig. 12 is a sectional view taken through the belt substantially along lines 12—12 in Fig. 11.

Figure 4:
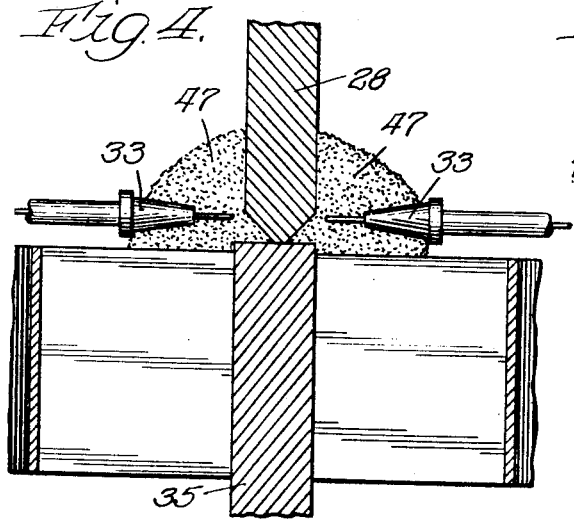
Fig. 4 is an enlarged detailed view of the flux carrying shoe and welding heads for simultaneously welding opposite sides.

While my invention is susceptible of embodiment in many different forms, I have shown in the drawings and will herein describe in detail several such embodiments with the understanding that the present disclosure is to be considered as an exemplification of the principles of the invention and is not intended to limit the invention to the embodiments illustrated. The scope of the invention will be pointed out in the appended claims.

Referring now to the drawings, I show a carriage 20 comprising a pair of channel irons 21 held in spaced relationship by spacer blocks 22 and provided at its front end with a wheel 23 rotatably mounted between the frame members 21 and at its rear end with a second wheel 24 similarly mounted. Wheel 24 is adapted to be driven by means of a chain 25 connected to a variable speed motor 26. The wheels 23 and 24 are each formed with a deep groove 27 adapted to receive the upper edge of a plate 28 and to carry the carriage therealong.

A framework 29 is suspended vertically from the carriage and is provided at its lower end with a welding apparatus 30. In the particular embodiment in Figs. 1 to 4, inclusive, two such frames 29 and apparatus 30 are provided, one of the frames being hinged to the carriage. As the frames and welding apparatus on both sides of the plate are similar in all respects, only one will be described in detail. Accordingly, the welding apparatus 30 comprises a drum 31 adapted to hold a coil of electrode wire and motor means 32 adapted to feed the electrode from the coil to a welding head 33 directed against the seam 34 existing between the plate 28 and a lower plate 35. In the particular emboodiment of the invention chosen for illustration, the welding apparatus is known as the "Unionmelt" apparatus and the motor means is provided with means regulating the rate of feed of the electrode in response to variations in voltage across the welding zone. Means (not shown) are also provided for establishing the proper distribution of electrical energy to create an arc for accomplishing welding. Means in the form of manually operable handles 36 and 37 are provided for moving the welding head 33 inwardly, outwardly and vertically to locate the welding head the correct distance and in correct alignment with the seam 34. A spring 38 is connected to the frame and to the welding apparatus to urge the latter against the plate 35.

The lower portion of the frame 29 is provided with a pair of wheels 39 in rolling contact with the plate 35. Clutch means operated by the handle 40 are provided to clutch the driving motor 26 to the wheel 24 to propel the carriage, and hence the apparatus, along the seam. The driving motor 26 may be adjusted to give a speed along the weld of from 10 to 60 inches per minute.

As previously indicated, the particular welding apparatus shown uses the so-called submerged arc method of welding in which the arc existing between the end of the electrode and the seam to be welded is completely covered by a pile of granular flux material. The flux used in the method shown is a granulated, chemically stable, fusible material substantially free from substances evolving large amounts of gas during welding. The unfused portions of this particular type of granular flux may be used repeatedly without ill effect. I provide a hopper 42 adapted to carry a supply of the flux material and deliver it by means of a pipe 43 to a support 44 for the flux immediately ahead of the arc. It is the function of the flux 47 to make possible the use of very high currents, to concentrate the generated heat, to cleanse the molten metal and hold it in place, and to shield the hot weld metal from the atmosphere. For this reason, the flux support has sufficient width and length to permit the establishment of a dam of flux and to retain the flux in position until the weld is quenched. A suction pipe 45 has its lower end closely adjacent the support behind the arc to pick up unfused flux material from the support through the medium of a pump 46 and return it to the hopper.

Figure 9:
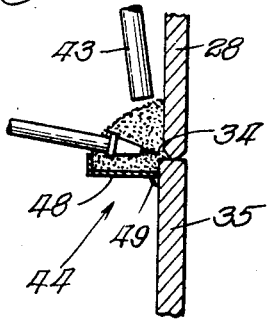
Fig. 9 is a view like Fig. 4, showing a modified form of flux carrier used in welding one side of a seam.

The simplest form of the support (shown in Fig. 9) is an angle iron 48 which is welded by tack welds 49 to the lower plate 35 immediately below the seam 34. Obviously, other means may be provided to hold the support in position. Flux is supplied through the pipe 43 to the support just ahead of the arc and the suction line 45 removes the unfused flux from the support after it has served its purpose.

Figure 10:
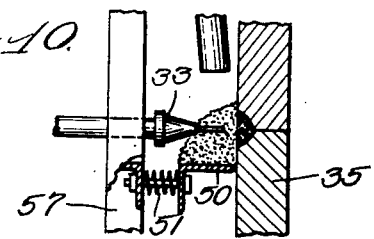
Fig. 10 is a view like Fig. 9 of another form of the device.

Another form of flux support is shown in Fig. 10 in which I provide a shoe 50 carried by the frame 29 and urged by means of a spring 51 outwardly against the plate 35 just below the seam. The shoe has a length along the seam sufficient to permit setting of the molten metal before the flux is removed therefrom by the suction pipe.

In Figs. 1 to 4, inclusive, I show a flux support comprising a caterpillar type tread 53 comprising an endless carrier 54 carrying a plurality of blocks 55. The carrier is mounted upon rollers 56 rotatably mounted about substantially vertical axes and carried at the upper ends of post 57 mounted on the framework 29. The blocks may be of steel, fiber, wood, asbestos, or the like. This particular embodiment of the invention is advantageous in that the flux does not move, that is, it is not dragged along the weld, as is the case in the embodiment of Fig. 10. The flux pours out of the pipe 43 onto the blocks 55 just ahead of the welding head 33 and remains in position against the seam until the carriage is moved a distance equal to the distance between the pipe 43 and the suction line 45, whereupon the unfused flux is removed and returned to the hopper.

Figure 7:
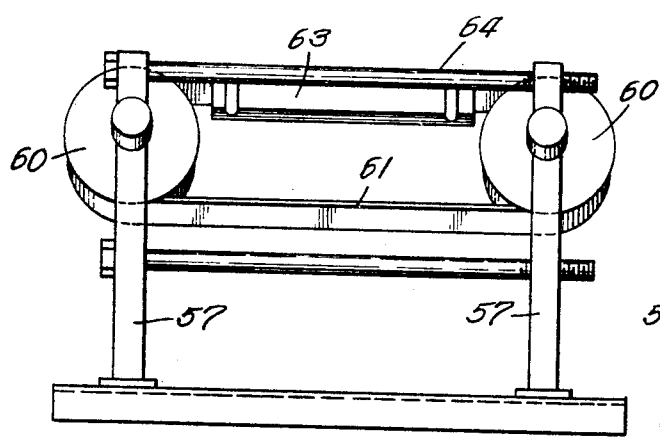
Fig. 7 is a side elevation of a modified form of the device.
Figure 8:
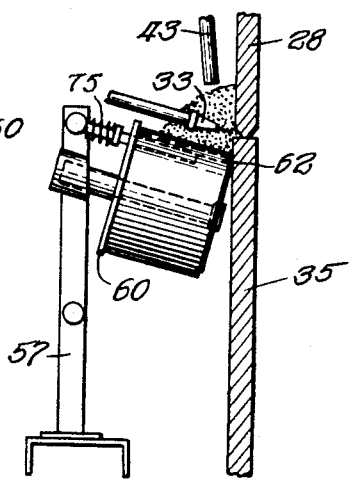
Fig. 8 is an end view of the device of Fig. 7.

A somewhat similar embodiment is shown in Figs. 7 and 8 in which a pair of rollers 60 are rotatably mounted on the post 57 about axes that are tilted somewhat from the horizontal, as shown in Fig. 8. An endless belt 61 is carried by the rollers and is driven by contact between the inner beveled and scored edge 62 of each roller and the lower plate 35. A support, in the form of a flat plate 63, is carried by a bar 64 which extends between the posts 57 adjacent their upper ends and supports the central portion of the belt against sagging under the weight of the flux.

In Figure 8 a spring 75 is shown apparently on the holder for the plate 63 urging the plate toward the tank shell. The flux belt has an operative run between the end pulleys which should have its inner edge against the plate 35. To insure that this relation exists, a pusher may be operated by a similar spring or by other means to press against the outer edge of the belt to flex or move the belt toward the plate thus insuring the mentioned contact. In Figures 11 and 12 enlarged details of the flux belt and its support are illustrated, wherein it will be noted that the supporting plate 63 is carried on the framework 76 supporting the end rollers 60. This plate thus does not move toward or away from the shell plate 35 unless the whole unit is so moved. The pusher comprises a pair of threaded screw members 77 passing through a bar 78 for moving a pusher bar 79 against the outer edge 80 of the belt. The pusher bar 79 has a guide rod 81 at each end loosely passing through the bar 78. An outwardly extending lip 82 is attached to the pusher bar 79 to overlie the upper edge portion of the belt. By tightening the screw member 77 the pusher bar may force the middle run of the belt 61 toward plate 35 insuring that the contact therebetween is tight; thus no flux will escape between the belt and plate 35. Other means may be used to push the belt if desired. Spring means may be used. However, it is preferred to use a pusher bar for the screw member since the tightness of the belt generally preferred is such as to cause the belt to hump up slightly between the pusher and the plate 35. The bar 78 may be supported on the framework which also supports the end rollers. In the present instance, a block 83 is shown as supporting the bar from a portion of the framework 76. The support should be rigid in order to provide an adequate base against the resiliency of the flux belt. In the particular detailed view of the belt shown in Figures 11 and 12, the framework 76 is pivoted on a pin 84 supported by a bracket 85, secured by a retaining plate 86 to a channel 87, which may be secured in turn to the framework members 29 of the machine. The pin 84 thus provides a central pivot for the whole flux belt unit. The flux supply and retrieving lines are shown fragmentarily to complete the picture of the apparatus.

Figure 5:
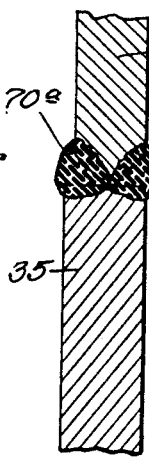
Figs. 5 and 6 are sectional views through welded seams.
Figure 6:
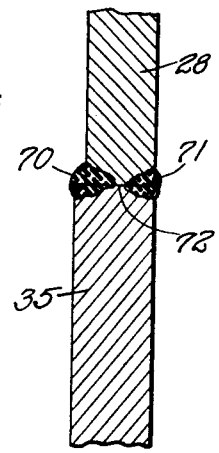

When the opposite sides of the seam are both welded, but not simultaneously, the result may be as shown in Fig. 6 wherein the weld 70 on one side and the weld 71 on the opposite side both extend toward, but do not reach, the center of the seam. If two welds do not meet, a small unfused area 72 is left in the joint. This is acceptable for low-stressed horizontal joints of oil storage tanks, according to the American Petroleum Institute standards which provide that such joints may have partial penetration, provided the unwelded portion is centrally located and does not exceed one-third of the thickness of the thinner plate welded. I have discovered, however, that the same expenditure of energy used in producing a partial-penetration joint, as shown in Fig. 6, will produce a full-penetration joint, such as illustrated in Fig. 5, provided the two sides are welded simultaneously. The upper and lower plates shown in Fig. 5 have the same thickness as the plates of Fig. 6 and the outer weld 70a extends to the inner weld 71a so that there is complete fusion at the joint. It is believed that welding both sides simultaneously provides a very high heat input which induces deep penetration, and the electric arc method illustrated produces a magnetic field to hold the molten metal in the seam. I find that I can constantly produce welds of the type shown in Fig. 5 wherein the area of fusion extends completely through the seam even with plate thicknesses up to one inch or more. If it is desired to weld both sides simultaneously, but without complete fusion through the seam, the welding head on one side may be advanced six or eight inches ahead of the welding head on the other side.

The plates to be welded should be squared to an accuracy of $\frac{1}{16}$ inch in the shop. This is customary procedure.

The operation of my apparatus in the field is exceedingly simple, it being only necessary to secure the plates together in edge-to-edge relationship by means of temporary keying apparatus or the sort, place the carriage on the upper edge of the plate, make the initial adjustment at the wheels to position the welding head 33, and then start the arc, the flow of flux, and the movement of the carriage by operation of appropriate controls. The welding will be continuous either on one or both sides of the seam, as desired, until the entire length of the seam has been completed. While it may be unnecessary to adjust the welding apparatus during its travel along the seam, I find it advisable to provide a pointing device just ahead of the welding head and aligned therewith, inasmuch as the welding head itself is hidden beneath the flux during the welding. A man may watch the travel of the pointer along the weld and make whatever minor adjustments are necessary to maintain proper alignment as the carriage moves from plate to plate.

I claim:

1. Welding process for use on an upstanding shell, comprising the steps of movably holding the ends of a deformable, substantially longitudinally extended strip to the ends of a horizontal area of the shell; deforming an intermediate portion of the so extended strip toward the shell to press said portion to the shell regardless of horizontal curvature and irregularities in the shell; pouring onto said portion a layer of flux contacting the shell; and horizontally traversing the shell with a welding arc submerged under the flux.

2. Welding process for use on an upstanding shell, comprising the steps of movably holding the ends of a flexible, substantially longitudinally extended strip to the ends of a horizontal area on the shell; resiliently flexing an intermediate portion of the so extended strip toward the shell to press said portion tightly to the shell regardless of horizontal curvature and irregularities in the shell; pouring onto said portion a layer of flux contacting the shell; and horizontally traversing the shell with a welding arc submerged under the flux.

3. Welding process for use on an upstanding shell, comprising the steps of temporarily holding the ends of a flexible, substantially longitudinally extended strip to the ends of a horizontal area of the shell; flexing an intermediate portion of the so extended strip toward the shell, beyond the position of the strip that is due to such holding, to press said portion tightly against the shell regardless of horizontal curvature and irregularities in the shell; pouring onto said portion a layer of flux contacting the shell; and horizontally traversing the shell with a welding arc submerged under the flux.

4. Welding process as described in claim 3 wherein the strip is substantially flat, extended in a substantially flat plane, and flexed substantially in said plane.

5. Welding process for use on an upstanding shell, comprising the steps of maintaining a run of an endless flexible belt substantially longitudinally extended; momentarily holding the ends of said run to the ends of a horizontal area on the shell; flexing an intermediate portion of said run toward the shell to press said portion tightly against the shelll regardless of horizontal curvature and irregularities in the shell; pouring onto said portion a layer of flux contacting the shell; horizontally traversing the shell with a welding arc submerged under the flux; and continously moving the endless belt horizontally along the shell.

6. Welding process as described in calim 5 wherein, incident to said moving of the belt and pressing of said run, said run is temporarily held in substantially stationary contact with the shell.

7. Welding apparatus for use on an upstanding shell, comprising an endless belt; means for temporarily maintaining a run of said belt substantially longitudinally extended along a horizontal area of the shell and for holding the ends of said run to the ends of said area; yielding means for flexing an intermediate portion of said run toward the shell to press said portion tightly against the shell regardless of horizontal curvature and irregularity in the shell; means for feeding flux and welding wire toward the shell directly above said portion; and a mechanism for moving said several means horizontally along the shell.

8. Welding apparatus as described in claim 7, wherein said means for holding and flexing a run of the belt comprises a pair of end pulleys horizontally spaced from one another to hold said run extended, and a mechanism interposed between said end pulleys for flexing said intermediate portion.

9. A welding process for use in automatically welding a horizontal seam between two upstanding shell plates comprising the steps of supporting a welding apparatus including a length of a deformable flux carrying belt with the latter horizontal and contiguous to said plates below said seam, moving said apparatus in one direction along said plates while moving said flux belt in the opposite direction to maintain the latter stationary with respect to said plates during movement of said apparatus, independently urging an intermediate portion of said belt toward said plates to press said portion into contact with the plates regardless of horizontal curvature and irregularities in said plates and joints therebetween, feeding a layer of flux onto said portion of said belt, and providing a welding arc submerged in said flux as said apparatus travels along said plates.

10. A welding process for use in automatically welding a horizontal seam between two upstanding shell plates as defined in claim 9 wherein said length of flux belt is the upper run of a continuous flexible belt.

11. In a welding apparatus for submerged arc welding of substantially horizontal edges of substantially vertically curved stationary shell plates, a chassis for carrying the apparatus along the plates in a direction parallel to the edges to be welded, said chassis including an endless flux carrying belt supported with its end portions engaging said plates, means for moving said belt in a direction opposite to the forward movement of the chassis and at the same speed whereby said belt remains stationary with respect to said plates during movement of the apparatus along the plates, means for flexing an intermediate portion of said belt toward the plates to press said portion tightly against the plates regardless of horizontal curvature and irregularities in the plates, means for feeding flux to the belt, and means for providing a welding arc submerged under the flux during movement of said chassis.

12. In a welding apparatus for submerged arc welding of horizontal edges of vertically curved stationary shell plates; a chassis for carrying the apparatus along the plates in a direction parallel to the edges to be welded, said chassis including a horizontal flux support positioned with one longitudinal edge in engagement with said plates and carried by said chassis for movement therewith, and for independent horizontal movement with respect to said chassis and toward said plates; resilient means tending to impart independent movement of the flux support toward the plates to press it tightly against the plates during travel of such support with said chassis; means for feeding flux to said support; and means for providing a welding arc submerged under the flux during the movement of said chassis.

References Cited in the file of this patent

UNITED STATES PATENTS

| | | |
|---|---|---|
| 857,292 | Machlet | June 18, 1907 |
| 2,529,812 | Peters | Nov. 14, 1950 |
| 2,638,524 | Meyer | May 12, 1953 |